United States Patent
Mori

(10) Patent No.: US 9,959,577 B1
(45) Date of Patent: May 1, 2018

(54) TAX RETURN PREPARATION AUTOMATIC DOCUMENT CAPTURE AND PARSING SYSTEM

(75) Inventor: Kenichi Mori, Carlsbad, CA (US)

(73) Assignee: Intuit Inc., Mountain View, CA (US)

( * ) Notice: Subject to any disclaimer, the term of this patent is extended or adjusted under 35 U.S.C. 154(b) by 1672 days.

(21) Appl. No.: 11/529,039

(22) Filed: Sep. 28, 2006

(51) Int. Cl.
  *G06Q 40/00* (2012.01)

(52) U.S. Cl.
  CPC .................................. *G06Q 40/123* (2013.12)

(58) Field of Classification Search
  USPC .......................................................... 705/35
  See application file for complete search history.

(56) References Cited

U.S. PATENT DOCUMENTS

| | | | |
|---|---|---|---|
| 5,809,250 A | 9/1998 | Kisor | |
| 5,845,290 A | 12/1998 | Yoshii | |
| 5,960,429 A | 9/1999 | Peercy et al. | |
| 6,035,332 A | 3/2000 | Ingrassia et al. | |
| 6,092,090 A * | 7/2000 | Payne et al. | 715/234 |
| 6,418,471 B1 | 7/2002 | Shelton | |
| 6,718,337 B1 | 4/2004 | Klein et al. | |
| 7,386,792 B1 * | 6/2008 | Bascom et al. | 715/205 |
| 2004/0015523 A1 * | 1/2004 | Guest et al. | 707/204 |
| 2005/0262438 A1 | 11/2005 | Armstrong et al. | |
| 2006/0061806 A1 * | 3/2006 | King et al. | 358/1.15 |
| 2006/0089983 A1 * | 4/2006 | Piersol | 709/223 |
| 2007/0260520 A1 * | 11/2007 | Jha et al. | 705/14 |

* cited by examiner

*Primary Examiner* — Gregory A Pollock
(74) *Attorney, Agent, or Firm* — FBFK PC

(57) ABSTRACT

A document capture system may automatically capture documents and/or financial information for a user. The document capture system may capture and save documents a user views in a web browser. A user may visit various web sites to view financial data and a document capture plug-in module installed in the web browser may capture or save the viewed document. The document capture system may capture financial data while the user is visiting web sites normally—that is, not just when the user if visiting them particularly to collect financial data. The document capture system may be configured to automatically detect when the user views certain documents and may be configured to continually monitor the user's web activity in order to capture financial documents whenever the user visits certain sites. The document capture system may include a list of URLs representing web sites or documents that should be automatically captured.

19 Claims, 7 Drawing Sheets

TAX RETURN PREPARATION AUTOMATIC DOCUMENT CAPTURE AND PARSING SYSTEM

BACKGROUND

Typically, data collection systems, such as tax return preparation software, present a long list of questions (e.g., in the form of a series of user interface questionnaire screens or forms) to determine what information the user has and/or needs. Traditional data collection systems frequently ask every user every possible question regardless of whether or not the question actually applies to the user. Generally, data collection systems ask specific, often industry specific, questions regarding individual pieces of data. Thus, users are frequently confused into thinking they need the specific information instead of realizing that the information doesn't apply to a particular user's situation. For example, tax preparation software frequently asks questions regarding sometimes extremely complicated tax issues, often using esoteric terms (sometimes by necessity), that don't apply to an average individual. The questions asked by traditional tax preparation software generally are Yes/No type questions. For example, a program may ask various Yes/No questions in the form, "Do you have . . . ?", over and over again until the user answers in the positive in regard to various types of documents or forms. Thus, when using traditional data collection system, a user may spend much time providing negative answers to questions that are irrelevant to the user's situation.

Some traditional document data collection systems may ask the user hundreds of questions to determine exactly what documents the user has and that need to be entered. Frequently the user must search through a collection of documents to locate and obtain every document the data collection system needs in order to enter the documents in the exact order the system requires. Generally the order of data entry is not intuitive to the user. For example, traditional tax return preparation software frequently uses the government developed tax return forms as a basis for the order in which it requires the user to enter data. As the government tax forms are frequently considered poorly organized and not user-friendly, this can result in tax return preparation software that is non-intuitive and not user-friendly as well.

SUMMARY

A document capture system, such as may be part of tax return preparation or other financial software, may automatically capture documents and/or financial information for a user. The document capture system may capture and save portions of documents a user views in a network browser (e.g., web browser). For example, a user may visit various web sites to view financial data, such as bank statements, investment account information, tax data, or other financial documents. In some embodiments, the document capture system may install a plug-in module in the user's web browser. Subsequently, when a user views a financial document with the web browser the document capture plug-in module may capture or download the financial document for later use. Thus, the document capture system may capture financial data while the user is visiting web sites normally (that is, not visiting them particularly to collect financial data).

The document capture system may be configured to automatically detect when the user visits certain web sites or views certain documents, such as web pages displaying user financial or tax information and save the financial documents. In some embodiments, the document capture system may be configured to continually monitor the user's web activity in order to capture financial documents whenever the user visits certain sites, perhaps as part of the user's normal routine. In other words, the document capture system may download financial documents whenever the user happens to visit financial sites and may not require that that user specifically enter any financial data or visit any financial web site specifically to allow the document capture system to acquire financial data.

In order to detect that a document should be captured, the document capture system may include a list or set of financial sites or web pages that should be automatically captured when visited or viewed by the user. For example, the document capture system may include a list of URLs representing web sites or documents that should be captured whenever the user visits them, according to some embodiments. In other embodiments, the document capture system may utilize keywords or other information to indicate or determine which documents should be captured.

In other embodiments, the document capture system may be configured to allow the user to manually specify or request that a page or document should be captured. For instance, the document capture system may install in the web browser a "capture" button, or other mechanism, that the user may select or use to request capture of the currently viewed document. Thus, if a user visits a site or views a document that is not automatically detected by the document capture system as relevant to the user's financial data, the user may specifically request that the document be captured. In some embodiments, if the user manually requests the capture of a particular document, the document capture system may add a document to the list of web sites that are automatically captured so that if the user again views the document it is automatically captured.

When the user later desires to perform a particular financial task, such as preparing a tax return, some or all of the information needed may already have been captured by the document capture system. The document capture system may be configured to analyze and/or parse the captured documents, or the captured portions of documents, in order to determine or identify specific financial information about the user. For example, a user may view an online version of a W2 form and the document capture system may automatically capture the document displaying the W2 form. Subsequently, when the user desires to prepare a tax return (or other financial task), the document capture system may analyze and parse the downloaded W2 page to determine the specific information, such as the total wages, the amount of tax withheld, and other financial information, from the captured document. The document capture system may also use the information determined from the captured document to prepare the tax return (or to perform some other financial task), such as by entering the information in appropriate locations of various tax documents.

When parsing the downloaded financial documents, the document capture system may utilize one or more document templates describing document formats. For example, the document capture system may include a set of document templates describing data or document formats used by financial sites when displaying user financial information. The document capture system may be configured to analyze a captured document to determine which document template, if any, describes the captured document. In some embodiments, the document capture system may be configured to access a remote repository of document templates to download document templates. In some embodiments, the document capture system may periodically download any available updated or revised document templates.

In some embodiments, the document capture system may analyze the captured documents to automatically determine what type of data is contained within each document, as noted above. In other embodiments, however, the document capture system may be configured to present a user interface allowing the user to specify or identify the financial information in a captured document. For example, if the document capture system is not able to determine the format for a particular downloaded document, the document capture system may display the document for the user and allow the user to identify, such as by using a mouse, a particular piece of relevant information on the displayed document. The document capture system may then present a user interface allowing the user to specify what type of information was identified. For example, the user may use the mouse to place a bounding rectangle around the display of the total wages on a W2 document and then utilize a popup menu to specify that the indicated value represents the total wages from the W2 form.

While the document capture system is described herein by way of example for several embodiments and illustrative drawings, those skilled in the art will recognize that the document capture system is not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope of the document capture system as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

A document capture system may automatically capture documents, such as web pages including a user's financial information, when a user views those documents in a web browser. For example, when a user uses the web browser to view financial documents, or web pages containing financial information, a document capture plug-in module in the web browser may download the financial document for later use when performing some particular financial task for the user.

Figure 1:
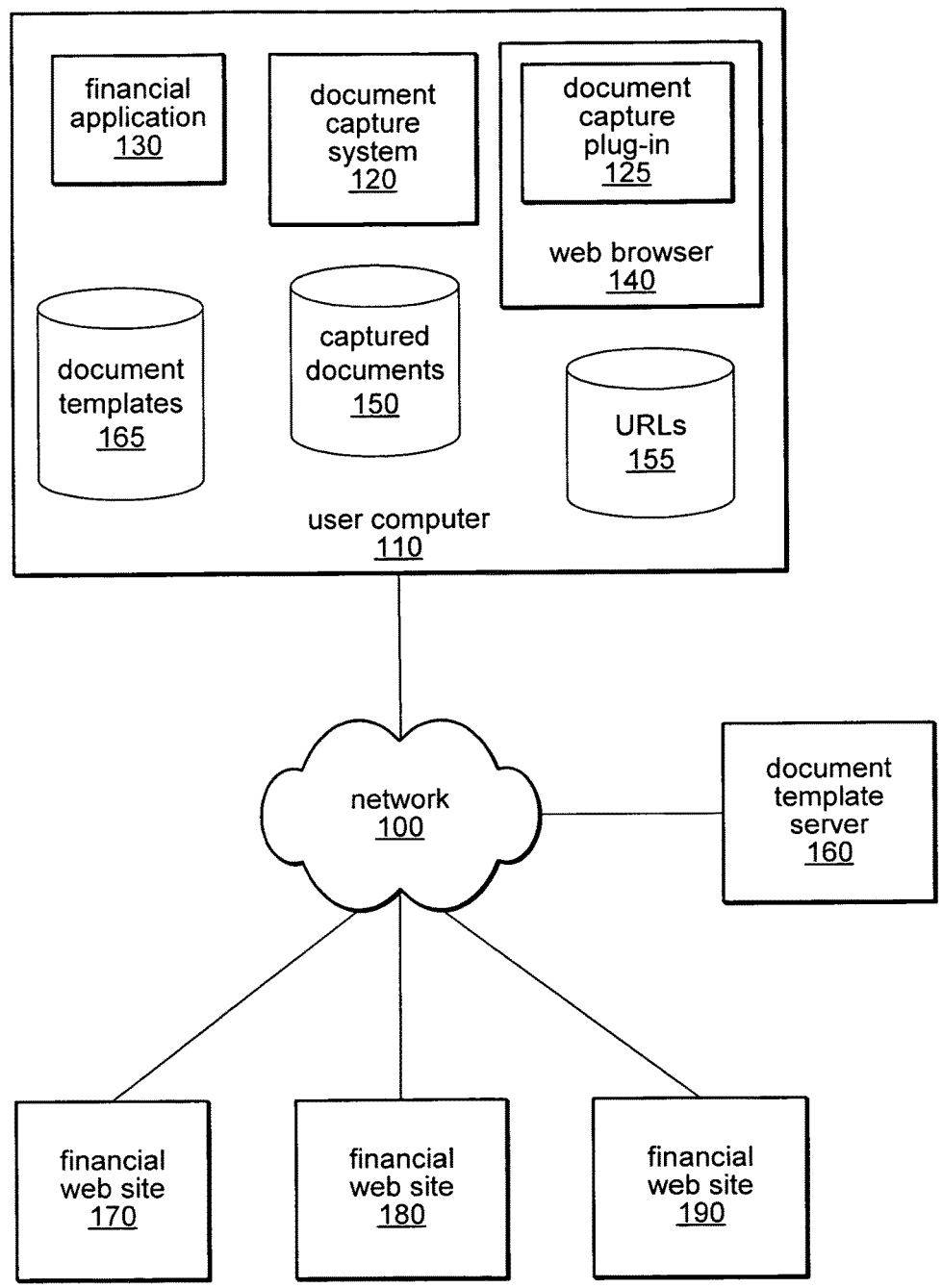
FIG. 1 is a block diagrams illustrating one embodiment of a document capture system, as described herein.

FIG. 1 illustrates a system including a document capture system 120 on a user's computer 110 that may be configured to automatically capture financial documents viewed in a web browser. As noted above, the document capture system 120 may include a document capture plug-in module 125 installed in the user's web browser 140. Web browser 140 may represent any of various web browsing applications, such as Microsoft Internet Explorer™, Netscape Navigator™, Mozilla Firefox™, or virtually any application that is capable of accessing and displaying documents or web pages, such as according to the Hypertext Transport Protocol (HTTP). Web browser 140 may be configured to access and display web pages or other documents over network 100. For example, in one embodiment, network 100 may represent the Internet and web browser 140 may be configured to access and display web pages (or other documents) from various web sites, such as financial web sites 170, 180 and/or 190. In other embodiments, however, network 100 may represent a local or corporate network, such as an Ethernet network, and financial web sites 170, 180 and 190 may represent documents located on or accessed via the local or corporate network.

In some embodiments, document capture system 120 may capture a portion of the document currently displayed by web browser 140 by programmatically obtaining the source code for the document from web browser 140. For example, document capture plug-in 125 may be configured to access a programmatic API provided by web browser 140 that allows the saving of the current document. Please note, while described herein mainly in terms of document capture system 120 performing the actual detection and capturing of documents in web browser 140, in some embodiments, document capture plug-in 125 may perform any or all of the actions to detect when the user is viewing a particular document and to capture a portion (or all) of the document. Furthermore, in some embodiments, document capture system 120 and document capture plug-in 125 may coordinate when detecting and capturing documents. For example, document capture plug-in 125 may communicate the URL of a web page being viewed by the user in web browser 140 to document capture system 120, such as via any form of inter-process communication, and rely upon document capture system 120 to determine whether or not the currently viewed document should be captured. Similarly, in some embodiments, document capture system 125 may obtain the source or HTML output for the currently viewed document from web browser 140, but may rely upon document capture system 120 to store the captured portion of the document in captured documents 150.

When capturing a document displayed in web browser 140, document capture system 120 and/or the document capture plug-in 125 may download the entire HTML page displayed by the web browser. In other words, document capture system 120 may save the entire HTML output for the current page being displayed in the web browser. For instance, a financial site may utilize a Common Gateway Interface (CGI) program or script to generate an HTML form or document and document capture system 120 may be configured to capture the HTML output of the CGI program (or script). Document capture system 120 may be configured to store one or more downloaded portions of documents locally on the user's computer, such as in captured documents 150. For instance, captured documents 150 may represent a database of saved files, formatted according to any of various database formats. In another embodiment, however, document capture system 120 may be configured to save each captured document as an individual file on the user's computer 110 and to store information regarding the captured documents, such as the path to the saved document, the URL from where the document was captured, the date and/or time the document was captured, in a database or other appropriate location, such as captured documents 150. In general, virtually any method of storing, and later accessing both the captured portions of documents and information regarding the captured documents may be utilized by document capture system 120, according to various embodiments.

In some embodiments, document capture system 120 may be part of a financial application, such as financial application 130 that may utilize financial data from the captured documents 150 to perform a particular financial task, such as tax return preparation, bookkeeping, accounting, or other task dependent upon information from financial documents. While document capture system 120 and financial application 130 are illustrated separately in FIG. 1, in some embodiments, document capture system 120 may be a part of or may include financial application 130. In one embodiment, both financial application 130 and document capture system 120 may both be modules of yet another, larger, software application. Additionally, document capture plug-in 125 may also be part of document capture system 120 and/or financial application 130. In some embodiments, document capture plug-in 125 may be installed in web browser 140 by document capture system 120, such as when document capture system 120 is installed on user computer 110. In other embodiments, document capture plug-in 125 may be installed in web browser 140 independently from when document capture system 120 is installed.

While FIG. 1 illustrates only a single web browser 140 including a single instance of document capture plug-in 125, in some embodiments, more than one web browser may be installed on user computer 110. Thus, in some embodiments, document capture system 120 may include multiple instances/versions of document capture plug-in 125 installed in different web browsers 140 of user computer 110. In another embodiment, document capture system 120 and/or financial application 130 may include web browser functionality themselves, allowing a user to access and view web pages and other documents over network 110. In yet other embodiments, document capture system 120 may include a capture process installed in a router, firewall or other location from which documents viewed over a network may be captured.

By automatically capturing financial documents whenever the user views them, such as in web browser 140, document capture system 120 may prevent the user from having to manually input (e.g. type in) some or all of the financial information required to perform a particular financial task, such as preparing a tax return. Instead, document capture system 120 and/or financial application 130 may be configured to analyze and/or parse the captured (and saved) portions of documents in order to determine and/or identify the relevant financial information.

Thus, document capture system 120 and/or financial application 130 may be able to capture and save relevant financial documents whenever the user happens to view the documents in web browser 140, rather than requiring the user to specifically collect the financial information when performing a particular financial task, such as preparing a tax return. In other words, the document capture system may download financial documents when the user is visiting financial sites normally, such as when viewing financial sites as part of the user's normal browsing activities. For instance, many people periodically check various financial accounts online via a web browser as part of their normal financial activities. For example, a user may normally review various financial documents online periodically, such as checking a bank statement or investment account status every week. Document capture system 120 may automatically detect, such as via document capture plug-in 125, whenever the user visits relevant financial sites or views relevant financial documents. Thus, document capture system 120 may, in some embodiments, be capturing documents for a period of time, such as a few days, weeks or months, prior to when the user may desire to perform a particular financial task. In other embodiments however, the user may install document capture system 120 and purposefully view several relevant documents using web browser 140 in order to perform a particular financial task immediately.

As noted above, for instance, document capture system 120 may include a set or list of URLs, such as URLs 155, indicating documents or web pages that should be considered relevant or that may include relevant financial documents and thus, should be captured and saved. In some embodiments, document capture system 120 may include a list of URLs that represent particular documents or web pages, but in other embodiments, document capture system 120 may include a list of URLs representing web sites and document capture system 120 may be configured to determine which pages or documents from a web site should be captured and downloaded, as will be discussed in more detail below. In yet other embodiments, document capture system 120 may use information other than URLs to indicate web sites, web pages, or other documents that should be captured. For example, in one embodiment, document capture system 120 may include a set of keywords or other information according to which document capture system 120 may determine whether a particular site, page or document should be captured. In some embodiments, document capture system 120 may be configured to store multiple types of information for determining which web site, web pages or other documents to capture. For example, document capture system 120 may include lists of URLs and keywords for determining which documents to capture.

Please note, the document capture system described herein may be configured to capture a portion (or all) of a document, web page, web site or other information displayed by a web browser or other document viewer and that when used to describe the capabilities of a document capture system, the terms "document", "web page" and/or "web site" may be used interchangeably herein. Additionally, document capture system 120 is described herein both in terms of capturing both a portion of document and in terms of capturing an entire document. However, the captured portion of a document may represent the entire document in some embodiments. In other embodiments, however, document capture system 120 may only capture part of a document. Thus, any action, attribute, or functionality described herein regarding a portion of a document may represent the same action, attribute or functionality regarding the entire document. Similarly, any action, attribute or functionality described herein regarding a document in general may represent the same action, attribute, or functionality regarding only a part of the document.

In one embodiment, document capture system 120 and/or document capture plug-in 125 may be configured to continually monitor the user's web activity in order to capture financial documents whenever the user visits certain sites as part of the user's normal routine. For example, document capture plug-in 125 may be configured to compare each web page visited or viewed by the user to a list of URLs, keywords, or other information to determine whether the currently viewed document should be captured. For instance, document capture system 120 may include a list of URLs that indicate that financial web sites 170, 180 and 190 may include documents including financial information about the user and that therefore should be captured. Please note that while FIG. 1 illustrates three web sites (financial web sites 170, 180, and 190) in other embodiments, document capture system 120 may include many more URLs in a list of key URLs to be captured. Additionally, financial web sites 170, 180, and 190 may, according to various embodiments, represent entire web sites, individual web pages and documents, or groups of pages and documents. In general document capture system 120 may be configured to recognize virtually any document that may be accessed and/or displayed by web browser 140 and may store information identifying such a document in URLs 155 in order to automatically detect whenever the user visits or views the document in web browser 140.

In other embodiments, document capture system 120 may also determine whether to capture documents based on other criteria. For example, in one embodiment, document capture system 120 may detect, such as via document capture plug-in 125, that a currently viewed document includes one or more keywords that allow document capture system 120 to determine that the document should be captured. For instance, document capture system 120 may search documents viewed in web browser 140 for financially related keywords, such as "interest", "wages", or other keywords. When a currently viewed document includes one or more of the keywords, document capture system 120 may capture the document. As noted above, document capture system 120 may store a list of keywords for use in determining whether to capture a particular document.

In addition, document capture system 120 may download financial documents every time the user visits one of the relevant pages. In some embodiments, document capture system 120 may overwrite early versions of particular financial documents when a later version is downloaded. In other embodiments, however, document capture system 120 may store every downloaded versions of a document for subsequent analysis. For instance, saving every version of a financial document may help to ensure that the complete and correct version of the financial data in that document is available when required, such as to perform a particular financial task for the user. In yet other embodiments, document capture system 120 may be configurable by the user regarding whether an earlier version of a captured document is overwritten when document capture system 120 captured a later version of the document.

As described above, document capture system 120 may automatically detect when the user has visited or viewed a relevant financial site or page. In other embodiments document capture system 120 may be configured to allow the user to manually request that a page or document should be captured. For instance, in one embodiment, the document capture system may install in the web browser a "capture" button that the user may select to request capture of the currently viewed document. Thus, if the user views a relevant financial document that document capture system 120 does not automatically capture, the user may specifically request that document capture system capture the currently viewed document, such as via a "capture" button displayed by document capture plug-in 125.

Figure 2:
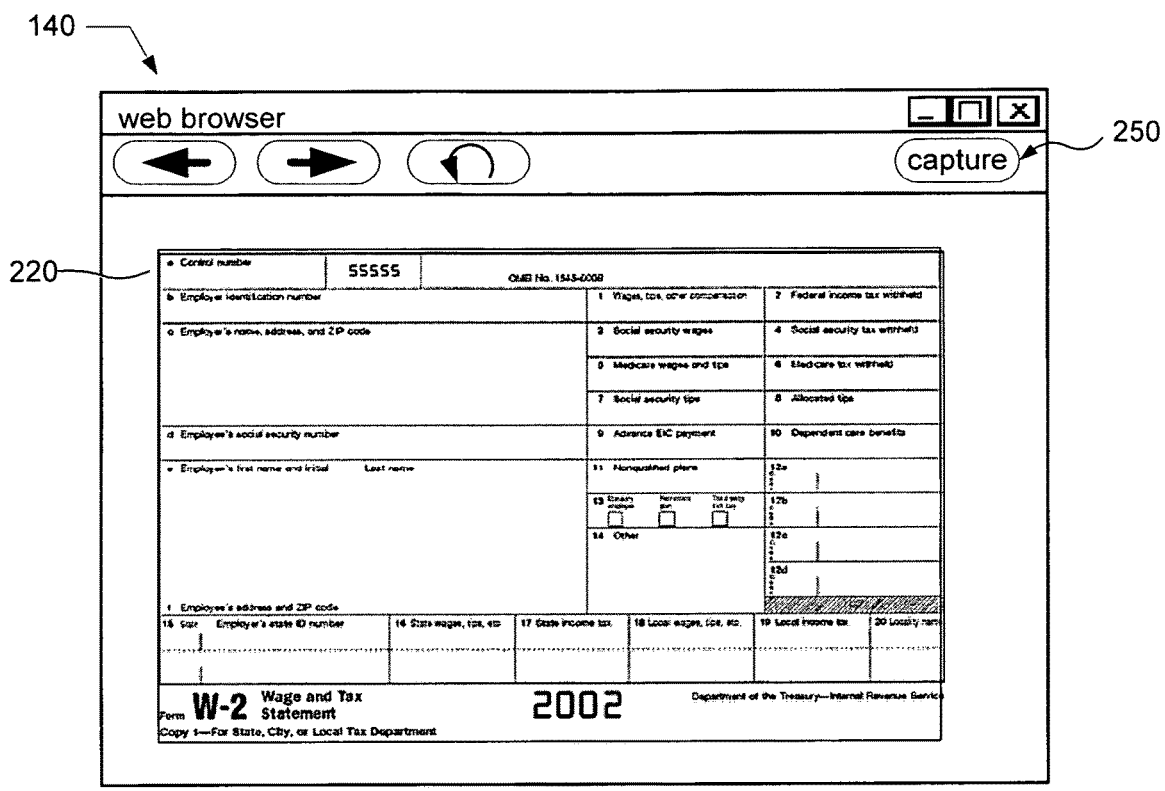
FIG. 2 is a image illustrating a web browsing including a plug-in document capture system, as described herein.

For instance, as shown in FIG. 2, which illustrates one embodiment of a web browser 140 including document capture plug-in 125. As illustrated in FIG. 2, a user may use web browser 140 to view a financial document, such as W2 220. As noted above, document capture plug-in 125 may install or display a "capture" button 250 in web browser 140, either in an upper toolbar as illustrated in FIG. 2 or elsewhere, allowing the user to manually request the capture of a document. Thus, the user may select capture button 250 to request that the currently displayed document be captured by document capture system 210 (and/or document capture plug-in 125). In other embodiments, document capture system 120 may provide different and/or additional user interface controls allowing a user to manually request the capture of a document. For example, document capture system 120 and/or document capture plug-in 125 may provide one or more menu items, buttons, icons, or other controls, according to various embodiments.

In some embodiments, document capture system 120 may only capture documents when the user specifically requests it. In other embodiments, as described above, document capture system 120 may automatically capture documents it determines to be relevant it a particular financial task, such as tax return preparation. In yet other embodiments, document capture system 120 may be configured to automatically capture documents it determines to be relevant and additionally capture documents that are manually requested by the user. In some embodiments, after a user has manually requested that a particular document be captured and saved, document capture system 120 may automatically capture that document whenever the user subsequently views it. In some embodiments, when the user manually requests capture of a document, document capture system 120 may automatically add the URL (or other identifying information) for the document to URLs 155 (referring back to FIG. 1) to facilitate the subsequent automatic detection and capture of the document. In one embodiment, document capture system 120 may be configured to add the URL, or other identifying information, for the web site from which a document was manually captured, so that document capture system 120 may subsequently automatically capture other relevant documents from the same web site.

Thus, when a user desires to perform a financial task using document capture system 120 and/or financial application 130, such as preparing a tax return, most or all of the information needed to perform the specific financial task may already be available in the captured documents, such as may be stored in captured documents 150. In some embodiments, document capture system 120 may be configured to analyze and/or parse the captured/saved portions of documents in order to determine specific financial information contained in the documents. For example, a user may view an online version of a W2 form and document capture system 120 may automatically capture and/or download the web page displaying the W2 form. Subsequently, when the user desires to prepare a tax return, financial application 130 and/or document capture system 120 may analyze and parse the downloaded W2 page to determine the specific information, such as wages, tax withheld, and other financial information, from the captured document. Please note that in some embodiments document capture system 120 may be configured to capture multiple versions of a single document or document type, such as multiple W2 documents for an individual user, and may combine information from the multiple documents, such as by combining the wage information from the multiple W2 documents to determine the total wages earned by the individual.

When parsing the downloaded financial documents, document capture system 120 may utilize one or more document templates describing document formats. For example, the document capture system may include a set of document templates, such document template 165, describing the formatting of data for various types of documents, such as might be used by well-known financial sites when displaying user financial information. Document capture system 120 may be configured to analyze a captured document to determine which document template, if any, describes the format of the captured document. For example, in one embodiment, document capture system 120 and/or financial application 130 may be configured to search through document templates 165 comparing the format described in each document template with the formatting of the captured document to determine which document template may be used to parse the information in the captured document. In other embodiments, document capture system 120 may have knowledge of the particular document formats used by different web sites, and thus may be able to use the URL, in whole or in part, of the captured document as an index into document templates 165 to determine an appropriate document template to use when parsing the captured document.

Please note that while mainly described herein in terms of document capture system 120 performing the analysis and parsing of captured documents, in some embodiments, financial application 130, alone or in conjunction with document capture system 120 may analyze and/or parse captured portions of documents, such as by using an appropriate document template from document templates 165. In general, financial application 130 and document capture system 120 may each perform any of the actions described herein as being performed by the other and vice versa. Thus, is some embodiments, the actual capturing and/or saving of documents may be performed by a document capture plug-in 125 and/or document capture system 120 and the analysis and parsing of the downloaded documents may be performed by document capture system 120 and/or financial application 130. In other embodiments, however, both the capturing and analysis may be performed by a single application, either document capture system 120 or financial application 130. In yet other embodiment, as noted above document capture system 120 and/or financial application 130 may include a web browser or web browsing functionality configured to allow a user to view web pages and other documents as well as capture documents or pages viewed by the user.

In some embodiments, document capture system 120 may be configured to access a remote repository of document templates, such as on a document template server 160, either instead of or in addition to accessing document templates 165. For example, document capture system 120 may be configured to periodically download document templates, such as new or updated templates, from document template server 160 and may add the newly downloaded templates to document templates 165. In other embodiments, document capture system 120 may be configured to not store document templates 165 locally, but rely instead on document templates from document template server 160. For instance, when document capture system 120 needs to parse a captured portion of a document, in one embodiment document capture system 120 may communicate the URL of the captured document to document template server 160 and may receive from document template server 160 a document template appropriate for use in parsing the captured document.

Figure 3:
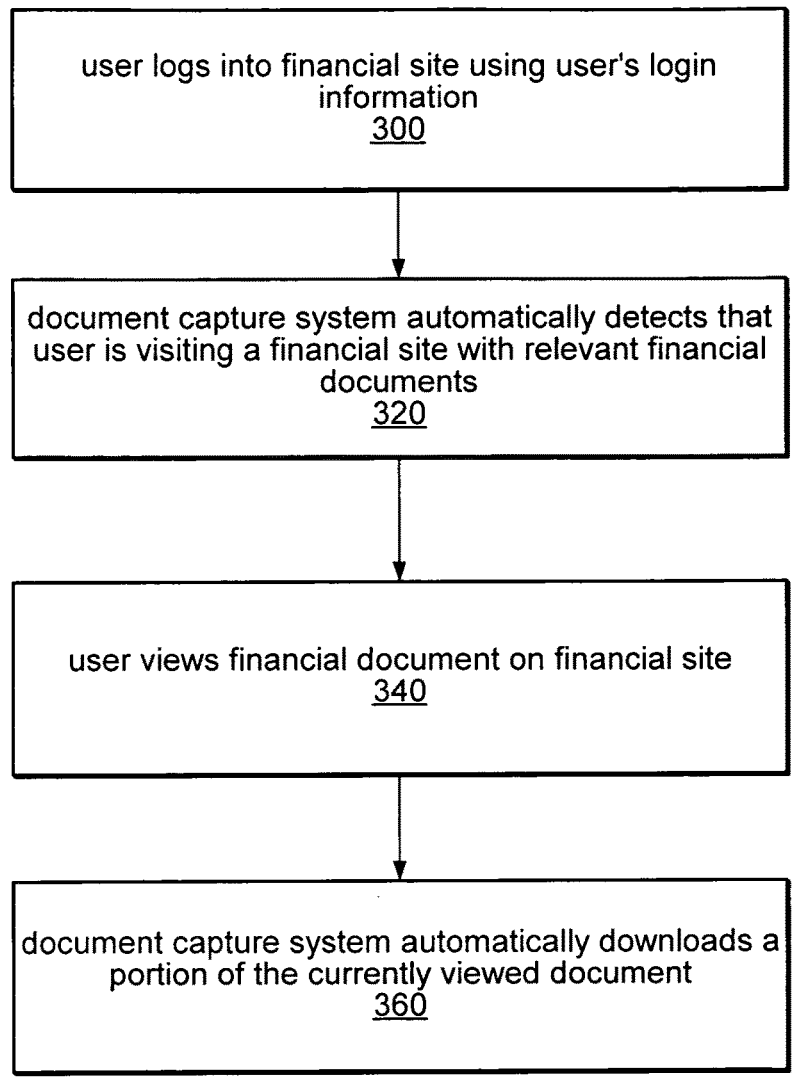
FIG. 3 is a flowchart illustrating one embodiment of a method for automatic document capture, as described herein.

FIG. 3 is flowchart illustrating one embodiments of a method for automatically capturing a financial document, as described herein. As illustrated by block 300, a user may access a web site, such as by using web browser 140. In one embodiment, the web site may a web site providing financial information regarding the user, such as financial web site 170, 180 or 190. The financial site may be a secure site and may require the user to present login credentials, such as username and password, before gaining access. Please note however, that in some embodiments, the web site may not be a secure web site and thus the user may note have to specifically log into the site before accessing and viewing a particular document, as will be described below regarding block 340. However, in some embodiments, document capture system 120, such as via document capture plug-in 125, may be configured to detect when the user logs into a secure financial site prior to the user actually accessing or viewing any particular documents including financial information about the user.

As described above, document capture system 120 may automatically detect that the user is visiting a financial site with relevant financial documents, as indicated by block 320. For example, as noted above, the document capture system may, in one embodiment, include a list of URLs, such as URLs 155, for various sites that may include financial documents relevant to a particular financial task, such as tax return preparation. As noted above, document capture system 120 may compare the URL of the site being accessed by the user with the list of URLs in URLs 155 to determine whether the current web site may contain documents that should be captured.

In another embodiment, the user may have previously requested (manually) that document capture system 120 capture a document from this site and therefore document capture system 120 may automatically detect whenever the user again visits this site. For example, as noted above, when the user previously visited this particular web site, the user may have manually requested, such as by selecting capture button 250, that document capture system 120 capture and save a document. In response, document capture system 120 may have added the URL, or other identifying information, for the site to URLs 155 so that document capture system 120 may automatically recognize the site as including documents to be captured when the user subsequently visits the site.

As illustrated by block 340, the user may view a financial document on the site and document capture system 120 may automatically capture and save a portion of the currently viewed document, as illustrated by block 360. The user may view a particular document, such as a bank statement, investment account summary, or other financial document, causing the document to be displayed in web browser 140. Document capture system 120 and/or document capture plug-in 125 may then download and store the displayed document. Thus, by using a plug-in module, such as document capture plug-in 125, in web browser 140, rather than attempting to access the web site and download the document directly, document capture system 120 may rely upon various functionality of web browser 140, such as relying on web browser 140 to initiate and maintain a secure session and to decrypt the document sent from a secure web site. Thus, document capture system 120 may not have to include all the functionality required to communicate with and access web pages or other documents provided by secure web sites, such as sites requiring the user of the Hyper Text Transport Protocol using Secure Sockets (HTTPS). Please note however that in other embodiments, as noted above, document capture system 120 may include web browser 140 or other web browsing functionality and therefore may include the ability to communicate with secure web sites using secure sockets and to decrypt documents sent over such a secure communication protocol.

The document capture system may, in some embodiments, store the document in whatever format is used to display the document in the web browser. Thus, documents of various formats, such as HTML, XML, PDF or other file formats, may be captured and stored. In some embodiments, a captured document may be stored in the same format in which it was captured. In other embodiments, however, document capture system 120 may be configured to store a captured document in a different format than the format in which it was downloaded, displayed and/or captured. For example, document capture system 120 may add a wrapper format including additional information, such as the URL of the document, the date/time that the document was captured, or other information, around the captured format of the document. In other words, document system 120 may store a captured document in a format that not only includes additional information, but may also include the original document, thus allowing the original documents format to be retrieved when required. In yet other embodiments, document capture system 120 may be configured to convert captured documents into a different format. For example, in one embodiment document capture system 120 may be configured to convert all captured documents to PDF format.

Figure 4:
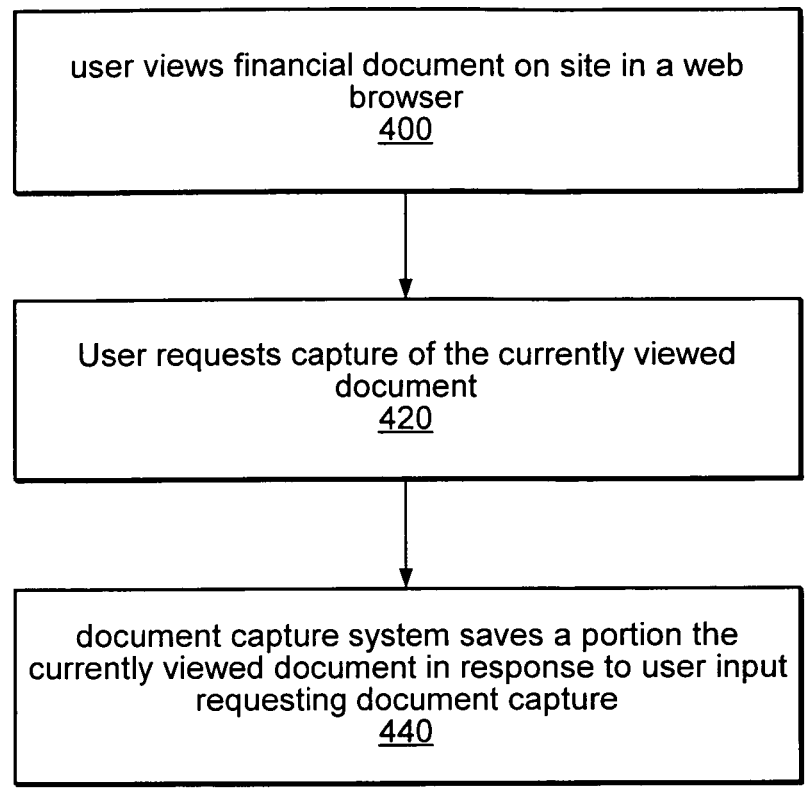
FIG. 4 is a flowchart illustrating one embodiment of a method for manual document capture, as described herein.

While in some embodiments, document capture system 120 may automatically determine to capture and save a particular document when viewed by a user in web browser 140, in other embodiments, the user may manually request the saving of a financial document. FIG. 4 is a flowchart illustrating one embodiment of a method for manual document capture, as described herein. For example, as illustrated by block 400, a user may view a financial document on a web site using a web browser, such as web browser 140. The user may then manually request that document capture system 120 capture and save the currently viewed document, as indicated by block 420. For instance, as noted above, document capture system 120 may include a document capture plug-in 125 in web browser 140 that may display or install a user interface control, such as push button 250 or a menu item, allowing the user to request the capture of the currently viewed document. In response to the user requesting the capture of the currently viewed document, document capture system 120 and/or document capture plug-in 125 may save a portion of the currently viewed document, as illustrated by block 440.

As described above, in some embodiments, document capture system 120 may be configured to automatically capture certain documents or documents from certain sites, while also allowing the user to specifically request capture of other documents. After a user has requested the capture of a document, document capture system 120 may be configured to automatically detect when the user subsequently views the same document and automatically capture the document. Similarly, document capture system 120 may also be configured to automatically capture other documents from the same site as a document for which the user manually requested capture.

Figure 5:
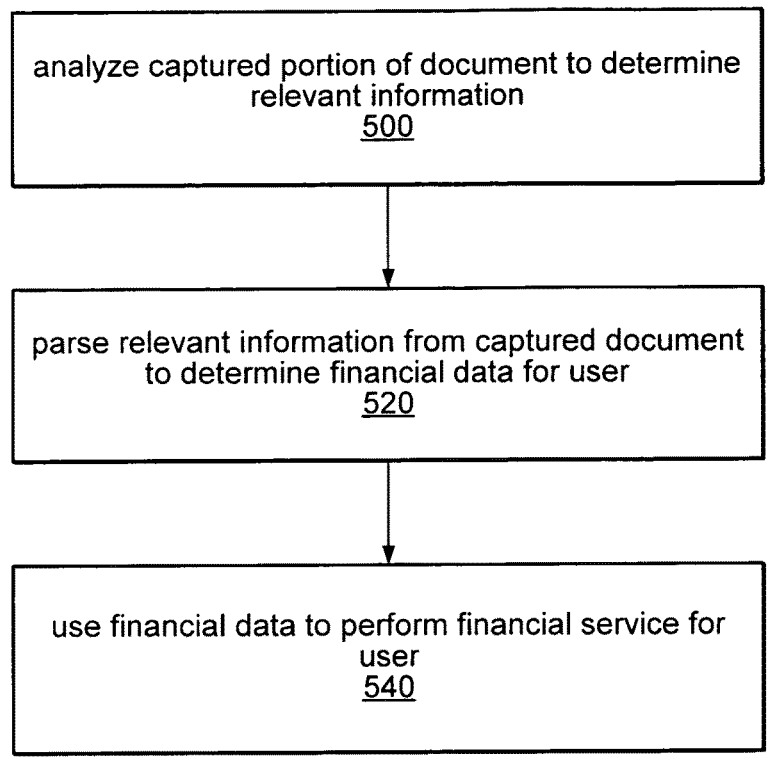
FIG. 5 is a flowchart illustrating one embodiment of a method for parsing financial information from a captured document, as described herein.

FIG. 5 is flowchart illustrating one embodiment of a method for parsing information from the downloaded document. As described above, document capture system 120 may capture and store many different financial documents as the user visits various financial web sites via web browser 140. Subsequently, either after each file is stored or when the user desires to perform a particular financial task, such as preparing a tax return, document capture system 120 and/or financial application 130 may analyze a captured portion of the document to determine relevant financial information from the document, as illustrated in block 500. For instance, as described above, document capture system 120 may analyze the captured document to determine a particular format used by document and may also obtain a document template, such as from document templates 165, that describes the particular formatting of the document. In addition, document capture system 120 may also analyze the document to determine which parts of the document contain relevant financial information and which part may not. For example, many web pages include various navigational links or controls, such as a column of navigational links on the top, left, button or right edge of the document, that are useful for navigating a particular web site, but that may not include any relevant financial information. Document capture system 120 may ignore other parts of the downloaded document, such as various advertisements, banners, headers and footers frequently included on web pages. Thus, document capture system 120 may analyze a captured document to determine which parts of the document contain financial information and which may not.

In one embodiment, document capture system 120 may have knowledge of the overall formatting of the captured document. For instance, document capture system 120 may understand the formatting of HTML documents and thus, may be able to identify various pieces of information from the documents. In another example, document capture system 120 may understand the data format used for PDF™ files and thus may be able to automatically determine what type of information may be included in a captured document that is formatted according to the PDF™ standard. Additionally, the document capture system may also have knowledge of the specific document format used for particular documents on various web sites, as will be discussed in more detail below.

In another embodiment, document capture system 120 and/or financial application 130 may include functionality to automatically detect the type or format of a captured document in various ways. For example, in one embodiment, document capture system 120 may be configured to allow the user to input a human language description of the document of a captured document and document capture system 120 may determine what type of document, such as a bank statement, W2, investment account summary, or others, from the user's description. In some embodiments, this may be useful for identifying captured documents that include graphically formatted data, that may otherwise be difficult to determine the format of. Additionally, in some embodiment, document capture system 120 and/or financial application 130 may display a set of example documents and allow the user to select the document that most closely matches the captured document. In yet another embodiment, document capture system 120 may be configured to determine a format or type for a captured document by automatically comparing the captured document to a set of document images.

Document capture system 120 may also be configured to parse the relevant information from the captured document to determine various pieces of financial data for the user, as illustrated by block 520. For example, document capture system 120 may have determined, through analysis of the document, that the document is an HTML formatted W2 statement, and may know the format of W2 statements used by the particular web site from which the document was downloaded. Thus, document capture system 120 may be able to parse the HTML formatted W2 statement to determine the individual data values for the various entries on the W2 form. Additionally, as noted above, document capture system 120 may utilize one or more document templates, such as from document templates 165 or from document template server 160, that describe the format of captured documents.

Additionally, in some embodiments, document capture system 120 may be configured to utilize Optical Character Recognition (OCR) functionality to parse captured documents formatted according to a graphic standard. For example, document capture system 120 may have captured a document formatted according to the JPEG™ graphic standards. For instance, some web sites display personal or financial information using graphics format to prevent unwanted interception or identification of that information via virus, mal-ware, or other harmful software. Thus, a captured document may contain relevant financial information formatted graphically and document capture system 120 may utilize OCR functionality to determine the actual information from the captured document.

As noted above, in some embodiments, document capture system 120 may analyze a captured document to automatically determine what type of data is contained within each document. In other embodiments, however, document capture system 120 may be configured to present a user interface allowing the user to specify or identify the financial information in a captured document. For example, if document capture system 120 is not able, or is not configured to, to automatically determine the format for a particular captured document, the document capture system may display the document for the user and allow the user to identify a particular piece of information in the displayed document. Document capture system 120 may then present a user interface allowing the user to specify what type of information was identified. For example, document capture system 120 may allow the user to use a mouse, or other input device, to place a bounding rectangle around the display of the total wages on a W2 document and then specify, such as via a popup menu, that the indicated value represents the total wages from a W2 form. The user may then continue to identify and/or specify various pieces of financial information from the captured document and document capture system 120 may use the user input to parse the captured document to determine the relevant financial information.

Additionally, document capture system 120 and/or financial application 130 may be configured to use the financial data to perform a particular financial service for the user, as illustrated by block 540. For example, document capture system 120 may be part of a tax preparation application, such as financial application 130, that may use the data parsed from the captured documents to prepare a tax return for the user. Document capture system 120 and/or financial application 130 may be configured to analyze and parse captured documents when the user desires to perform a particular financial task, such as preparing a tax return. Alternatively, in other embodiments, document capture system 120 may be configured to analyze and parse captured documents at the time they are captured, such as in the background when user computer 110 is otherwise idle. In some embodiments, document capture system 120 and/or financial application 130 may be configured to allow the user to specify when captured document should be analyzed and/or parsed.

Figure 6:
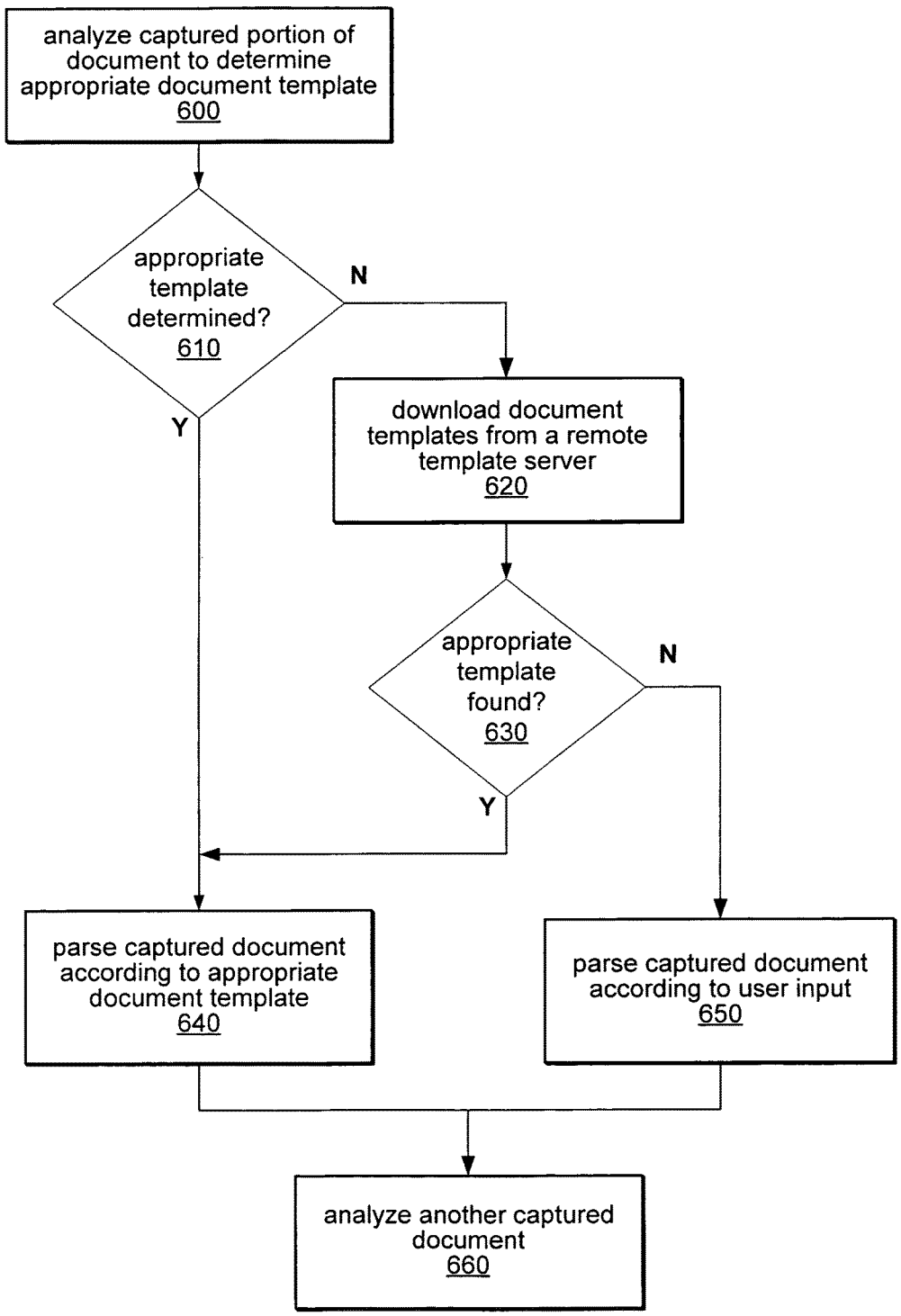
FIG. 6 is a flowchart illustrating one embodiment of a method for parsing financial information from a captured document, as described herein.
Figure 7:
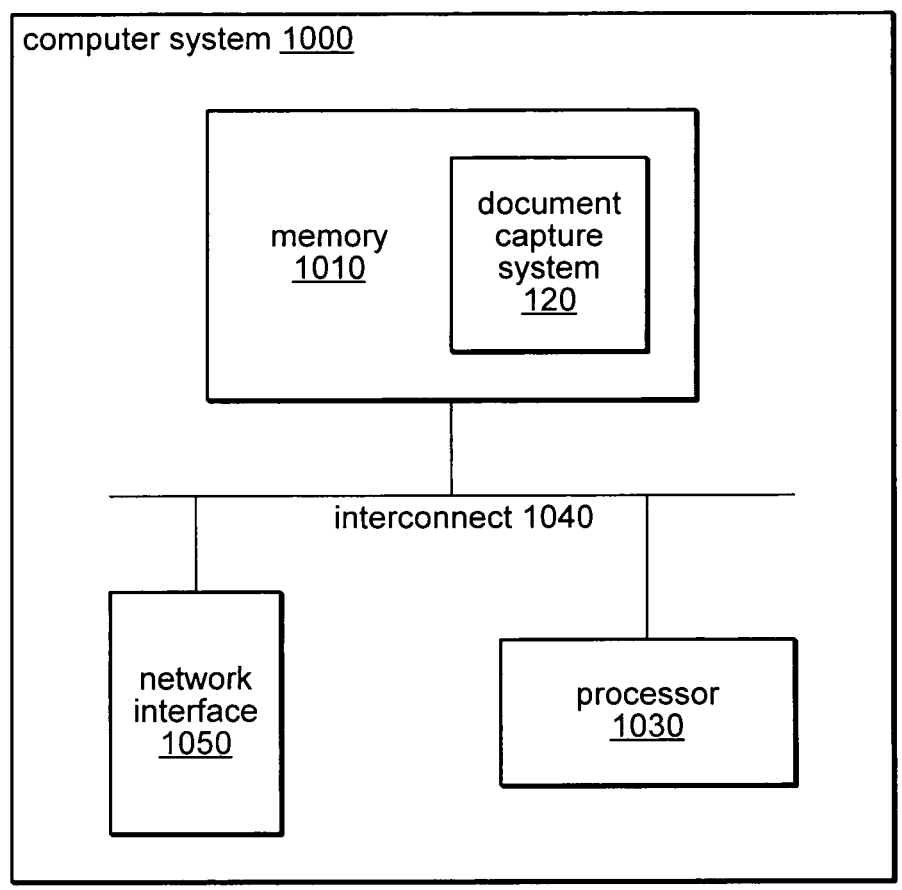
FIG. 7 illustrates a computing system capable of implementing a document capture system, according to one embodiment.

FIG. 6 is flowchart illustrating one embodiment of a method for using determining the format of a captured document. As illustrated in block 600, document capture system 120 may analyze a captured portion of the document to determine an appropriate document template such as from document templates 165, according to one embodiment. For example, a document template may describe the various pieces of information and the arrangement of that information for a particular document, such as for a bank statement from a particular financial institution.

Document capture system 120 may configured to search through a database of document templates, such as document templates 165, to locate a document template that matches a particular captured document. In one embodiment, the URL, or other identifying information, for the captured document may be used to locate an appropriate document template. For instance, according to one embodiment, document templates 165 may be indexed by URLs. In another embodiment, document capture system 120 may analyze a captured document to determine what type of document it is, such as bank statement or W2, and use the document type as well as the URL or particular financial institution from which the document was downloaded to locate an appropriate document template. In some embodiments, document capture system 120 may communicate with a remote template repository, such as document template server 160, either instead of or in addition document templates 165, to locate an appropriate document template. In general, virtually any method of indexing and searching a set of document templates may be utilized by document capture system 120 to determine an appropriate document template for a particular captured document.

As indicated by the positive output of block 610, if an appropriate document template was found, document capture system 120 may parse the captured document according to the appropriate document template. As described above, the document capture system may parse the captured document to identify various pieces of information and/or data values relevant to a particular financial task, such as tax return preparation.

If, however, an appropriate document template was not found, as indicated by the negative output of block 610, document capture system 120 may download additional document templates from document template server 160, as indicated by block 620. For example, document capture system 120 may be configured to check for updates to its set of document templates, such as document templates 165, if it cannot find an appropriate document template. Thus, in some embodiments, the document capture system may communicate with a separate server system, such as document template server 160, to download any available or updated document templates. The document capture system may then search through the new document templates to find a template that matches the captured document.

In some embodiments, document capture system 102 may upload information about the captured document to determine whether an updated document template for the captured document is available. For example, document capture system 120 may be configured to communicate information about a captured document, such as the URL from which the document was captured, to document template server 160 and receive from document template server 160 a document template describing the format of the particular captured document. Additionally, document capture system 120 may be configured to communicate the document type and an identification of the financial institution from which the document was downloaded to document template server 160 to determine whether an appropriate document template is available. In other embodiments, document capture system 120 may be configured to download all available new and/or updated templates and search through them to determine if one of them is appropriate for use in parsing the captured document.

If, as indicated by the positive output of block 630, if an appropriate template was found, document capture system 120 may then parse the captured document according to the appropriate document template. If, however, no appropriate document template was found and none was available on remote template server, as indicated by the negative output of block 630, document capture system 120 may parse the captured document according to user input, as indicated by block 650. As noted above, document capture system 120 may include functionality allowing the user to indicate and/or identify the relevant portions of the document to allow document capture system 120 to parse the document and gather the relevant financial information from it.

For example, in one embodiment, document capture system 120 may display an image of the captured document and allow the user to identify various pieces of information. For instance, document capture system 120 may allow the user to highlight a particular piece of information, such as by clicking and dragging a mouse to create a rectangle around the piece of information, and then identify what type of information it is. Thus, document capture system 120 may display a bank statement and the user may highlight a number displayed in the back statement and indicate that the highlighted value represents the total interested earned on the account during the last year. For example, document capture system 120 may allow the user may select various menu items indicating first that the document is a bank statement and selecting "yearly earned interest" from another menu (or cascading menus). Thus, in some embodiments, document capture system 120 may include menu items, or other user interface controls, allowing the user specify the particular types of information available on a captured document.

In some embodiments, document capture system 120 may be configured to use the user input both to parse the captured document as indicated by block 650, but also to create a document template allowing document capture system 120 to automatically parse similar documents in the future. In one embodiment, document capture system 120 may be configured to update a newly created document template to a central template repository, such as on document template server 160 so that other copies or instances of document capture system 120 on other machines may download the new template and be able to automatically parse similar documents, such as documents downloaded from the same URL. When creating and uploading document templates, document capture system 120 may ensure that no actual financial, personal or other information about the user is included in the information uploaded to the document template server.

After parsing the information from the captured document, either automatically using a document template or using user input, document templates system 120 may be configured to move on and analyze another captured document, as indicated by block 660, until all of the captured documents have been parsed. As noted above, the document capture system may be configured to use the total parsed data to perform a particular financial task for the user, such as preparing a tax return.

As described above, document capture system 120 may execute on various types of computer systems. FIG. 10 illustrates a computing system capable of implementing a document capture system, such as document capture system 120, as described herein and according to various embodiments. Computer system 1000 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, or in general any type of computing device. In various embodiments, computer system 1000 may represent user computer 110, described above.

The document capture system described herein may be provided as a computer program product, or software, that may include a computer-readable storage medium having stored thereon instructions, which may be used to program a computer system (or other electronic devices) to implement a document capture system as described herein. A computer-readable storage medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magnetooptical storage medium; read only memory (ROM); random access memory (RAM); erasable programmable memory (e.g., EPROM and EEPROM); flash memory; electrical, or other types of medium suitable for storing program instructions.

A computer system 1000 may include a processor unit 1030 (possibly including multiple processors, a single threaded processor, a multi-threaded processor, a multi-core processor, or other type of processor). The computer system 1000 may also include one or more system memories 1010 (e.g., one or more of cache, SRAM DRAM, RDRAM, EDO RAM, DDR RAM, SDRAM, Rambus RAM, EEPROM, or other memory type), an interconnect 1040 (e.g., a system bus, LDT, PCI, ISA, or other bus type), and a network interface 1050 (e.g., an ATM interface, an Ethernet interface, a Frame Relay interface, or other interface). The memory medium 1010 may include other types of memory as well, or combinations thereof. Embodiments of the document capture system described herein may include fewer or additional components not illustrated in FIG. 10 (e.g., video cards, audio cards, storage devices, additional network interfaces, peripheral devices, or other components). The processor unit 1030, the network interface 1050, and the system memory 1010 may be coupled to the interconnect 1040. It should also be noted that one or more components of system 1000 might be located remotely and accessed via a network. One or more of the system memories 1010 may embody a document capture system 120.

Network interface 1040 may be configured to enable computer system 1000 to communicate with other computers, systems or machines, such as across network 100, described above. Network 100 may enable data communication between computer system 1000 and among other entities illustrated in FIG. 1, such as document template server 160, and financial web sites 170, 180 and 190, described above. Network interface 1040 may use standard communications technologies and/or protocols. Network 100 may include, and network interface 1040 may utilize, links using technologies such as Ethernet, 802.11, integrated services digital network (ISDN), digital subscriber line (DSL), and asynchronous transfer mode (ATM) as well as other communications technologies. Similarly, the networking protocols used on network 100 may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols. The data exchanged over network 100 by network interface 1040 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of, or in addition to, the particular ones described above.

In some embodiments, memory 1010 may include program instructions configured to implement a document capture system 120, as described herein. Document capture system 120 may be implemented in any of various programming languages or methods. For example, in one embodiment, document capture system 120 may be JAVA based, while in another embodiments, it may be implemented using the C or C++ programming languages.

While the document capture system has been described herein with reference to various embodiments, it will be understood that these embodiments are illustrative and that the scope of the document capture system is not limited to them. Many variations, modifications, additions, and improvements are possible. More generally, the present document capture system is described in the context of particular embodiments. For example, the blocks and logic units identified in the description are for ease of understanding and not meant to limit the document capture system to any particular embodiment. Functionality may be separated or combined in blocks differently in various realizations or described with different terminology. Please also note that in reference to the methods illustrated by FIGS. 3-6, the various actions and functionality described herein regarding those respective methods may be performed in different orders and the respective method may be implement using a different number of actions than illustrated in FIGS. 3-6.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the document capture system as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A system, comprising:
a processor of a user computer; and
a memory coupled to the processor, wherein the memory comprises program instructions executable by the processor to:
automatically store a universal resource locator (URL) of a website previously visited by a user in response to a previous request from the user to save a first document of the website previously visited, wherein the first document is saved in a local captured document store on the user computer;
compare a URL of a website being logged into by the user to the URL of the website previously visited to generate a comparison;
detect the user revisiting the website previously visited based on the comparison;
responsive to detecting the user revisiting the website previously visited, automatically download a second document of the website previously visited, wherein the second document is downloaded in response to identifying a pre-determined keyword in the second document while the user is currently viewing the second document using a network browser, wherein the pre-determined keyword is determined prior to the user viewing the second document;
store the second document, after the second document is downloaded, in the local captured document store on the user computer;
parse the second document, after the second document is downloaded, to determine user financial data according to a pre-determined format associated with the URL; and
prepare a tax return for the user according to the user financial data.

2. The system of claim 1, wherein the program instructions are further configured to implement a browser plug-in module, wherein the plug-in module is installed in the network browser; and wherein the plug-in module is configured to perform said download of the portion of the financial second document.

3. The system of claim 1, further comprising a plurality of document templates indexed by a plurality of pre-determined URLs, wherein the plurality of pre-determined URLs comprises the URL, and wherein at least one document template of the plurality of document templates corresponds to the URL and comprises a document format description describing the pre-determined format associated with the URL.

4. The system of claim 3, wherein to parse the second document the program instructions are configured to:
analyze the second document to identify the at least one document template from the plurality of document templates; and
determine the user financial data according to the document format description of the at least one document template.

5. The system of claim 3, wherein the program instructions are further configured to download the plurality of document templates from a document template server.

6. The system of claim 1, wherein to parse the second document the program instructions are further configured to determine the user financial data according to user input regarding the second document.

7. The system of claim 6, wherein the user input comprises input indicating one or more portions of the second document comprising the user financial data.

8. A method, comprising:
automatically storing a universal resource locator (URL) of a website previously visited by a user in response to a previous request from the user to save a first document of the website previously visited, wherein the first document is saved in a local captured document store on a user computer;
comparing, by a processor of the user computer, a URL of a website being logged into by the user to the URL of the website previously visited to generate a comparison;
detecting, by the processor of the user computer, the user revisiting the website previously visited based on the comparison;
responsive to detecting the user revisiting the website previously visited, automatically downloading, by the processor of the user computer, a second document of the website previously visited, wherein the second document is downloaded in response to identifying a pre-determined keyword in the second document while the user is currently viewing the second document using a network browser, wherein the pre-determined keyword is determined prior to the user viewing the second document;
storing the second document, after the second document is downloaded, in the local captured document store on the user computer;
parsing, by the processor of the user computer, the second document to determine user financial data according to a pre-determined format associated with the URL; and
preparing a tax return for the user according to the user financial data.

9. The method of claim 8, further comprising installing a web browser plug-in module in the network browser, wherein the plug-in module performs said downloading.

10. The method of claim 8, further comprising:
obtaining at least one document template based on the URL from a plurality of document templates indexed by a plurality of pre-determined URLs comprising the URL, wherein the at least one document template comprises a document format description describing the pre-determined format associated with the URL,
wherein said parsing comprises:
analyzing the second document to identify the at least one document template from the plurality of document templates; and
determining the user financial data according to the document format description of the at least one document template.

11. The method of claim 10, further comprising downloading the plurality of document templates from a document template server.

12. The method of claim 8, wherein said parsing comprises determining the user financial data according to user input regarding the second document.

13. The method of claim 12, wherein said user input comprises input indicating one or more portions of the second document comprising the user financial data.

14. A non-transitory computer-readable storage medium, comprising program instructions that, when executed by a processor of a user computer, comprise functionalities for:
automatically storing a universal resource locator (URL), of a website previously visited by a user in response to a previous request from the user to save a first document of the website previously visited, wherein the first document is saved in a local captured document store on the user computer;
comparing a URL of a website being logged into by the user to the URL of the website previously visited to generate a comparison;
detecting the user revisiting the website previously visited based on the comparison;
responsive to detecting the user revisiting the website previously visited, automatically downloading a second document of the website previously visited, wherein the second document is downloaded in response to identifying a pre-determined keyword in the second document while the user is currently viewing the second document using a network browser, wherein the pre-determined keyword is determined prior to the user viewing the second document;
storing the second document, after the second document is downloaded, in the local captured document store on the user computer;
parsing the second document to determine user financial data according to a pre-determined format associated with the URL; and
preparing a tax return for the user according to the user financial data.

15. The non-transitory computer-readable storage medium of claim 14, wherein the program instructions are further executable to implement installing a web browser plug-in module in the network browser, wherein the plug-in module performs said downloading.

16. The non-transitory computer-readable storage medium of claim 14, further comprising program instructions executable to implement:
obtaining at least one document template based on the URL from a plurality of document templates indexed by a plurality of pre-determined URLs comprising the URL, wherein the at least one document template comprises a document format description describing the pre-determined format associated with the URL,
wherein said parsing comprises:
analyzing the second document to identify the at least one document template from the plurality of document templates; and
determining the user financial data according to the document format description of the at least one document template.

17. The non-transitory computer-readable storage medium of claim 16, wherein the program instructions are further executable to implement downloading the plurality of document templates from a document template server.

18. The non-transitory computer-readable storage medium of claim 14, wherein said parsing comprises determining the user financial data according to user input regarding the second document.

19. The non-transitory computer-readable storage medium of claim 18, wherein said user input comprises input indicating one or more portions of the second document comprising the user financial data.

* * * * *